US006865818B2

(12) United States Patent
Petrowich

(10) Patent No.: US 6,865,818 B2
(45) Date of Patent: Mar. 15, 2005

(54) CALIPER FOR MEASURING THE THICKNESS OF COLLATED PRINTED PRODUCTS

(75) Inventor: Jeffrey B. Petrowich, Ramsey, IL (US)

(73) Assignee: Southern Illinois Machinery Co., Inc., Shumway, IL (US)

( * ) Notice: Subject to any disclaimer, the term of this patent is extended or adjusted under 35 U.S.C. 154(b) by 44 days.

(21) Appl. No.: 10/379,070

(22) Filed: Mar. 4, 2003

(65) Prior Publication Data

US 2004/0172842 A1 Sep. 9, 2004

(51) Int. Cl.[7] ..................................................... G01B 3/00

(52) U.S. Cl. ................................ 33/501.02; 33/501.04; 33/832; 414/222.11; 414/911

(58) Field of Search .......................... 33/501.02, 501.03, 33/501.04, 832–834, 679.1, 501, 501.05; 414/222.01, 222.07, 222.11, 225.01, 911; 270/52.06

(56) References Cited

U.S. PATENT DOCUMENTS 3,664,655 A 5/1972 McCain et al.
4,022,455 A 5/1977 Newsome et al.
4,121,818 A 10/1978 Riley et al.
4,395,031 A 7/1983 Gruber et al.
4,778,167 A * 10/1988 Snow et al. ............. 270/52.04
4,799,661 A 1/1989 Nail
4,898,373 A * 2/1990 Newsome ................ 270/52.29
4,954,719 A * 9/1990 Harris ......................... 33/701
5,013,022 A * 5/1991 Graushar ..................... 270/56
5,125,642 A 6/1992 Orsinger et al.
5,244,162 A * 9/1993 Bruce ......................... 242/525
5,622,268 A 4/1997 Conner et al.
5,642,877 A * 7/1997 Green ......................... 271/35
5,647,583 A * 7/1997 Emigh et al. ............ 270/52.04
5,967,503 A 10/1999 Newsome
6,185,832 B1 2/2001 Hassell
6,196,537 B1 3/2001 Conner et al.
6,734,417 B2 * 5/2004 Vejtasa .................. 250/231.13
2001/0024010 A1 * 9/2001 Andersson et al. ........ 271/4.09
2002/0061238 A1 * 5/2002 Marsh ........................... 412/9

* cited by examiner

*Primary Examiner*—Diego Gutierrez
*Assistant Examiner*—Yaritza Guadalupe
(74) *Attorney, Agent, or Firm*—Alston & Bird LLP

(57) ABSTRACT

A caliper for measuring the thickness of collated printed products and which has a lever arm which is pressed into engagement with each of a plurality of printed products as they are serially conveyed past a measurement station. The lever arm is actuated by a servo motor which includes an encoder, and when the lever arm is pressed into engagement with each product, the position of the lever arm is sensed by the encoder which then delivers a signal to a controller where the thickness is calculated and compared with a predetermined correct value. A method of calibrating the caliper is also disclosed.

22 Claims, 4 Drawing Sheets

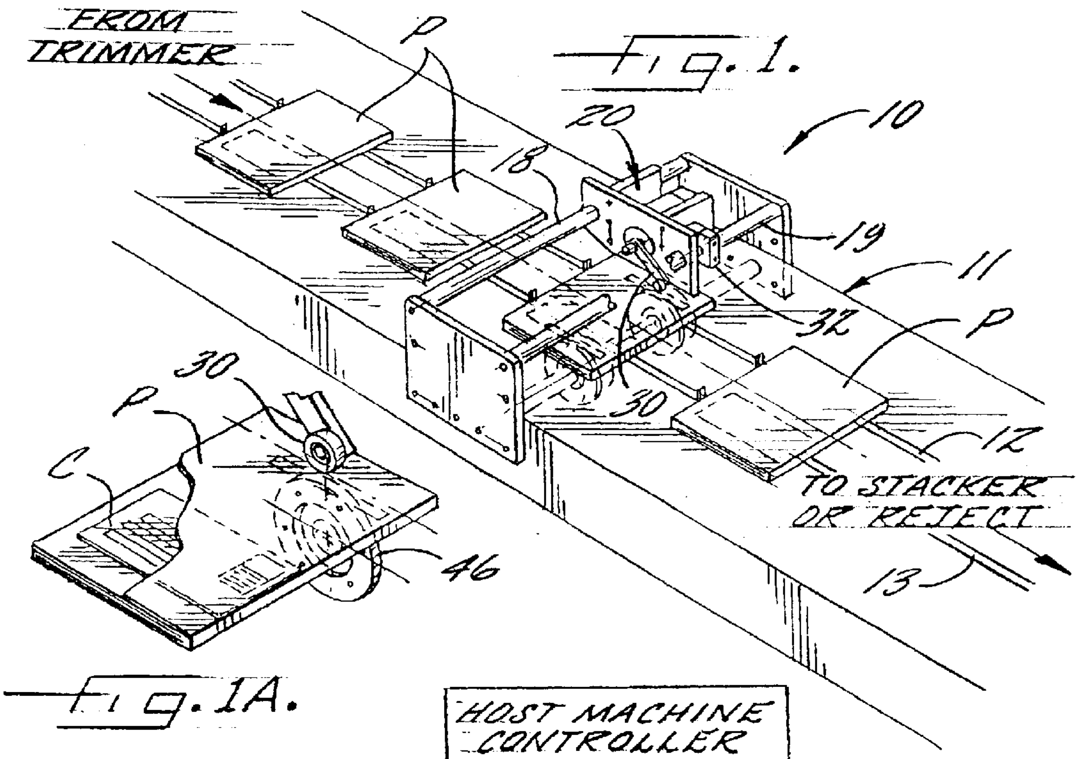
Fig. 1.
Fig. 1A.
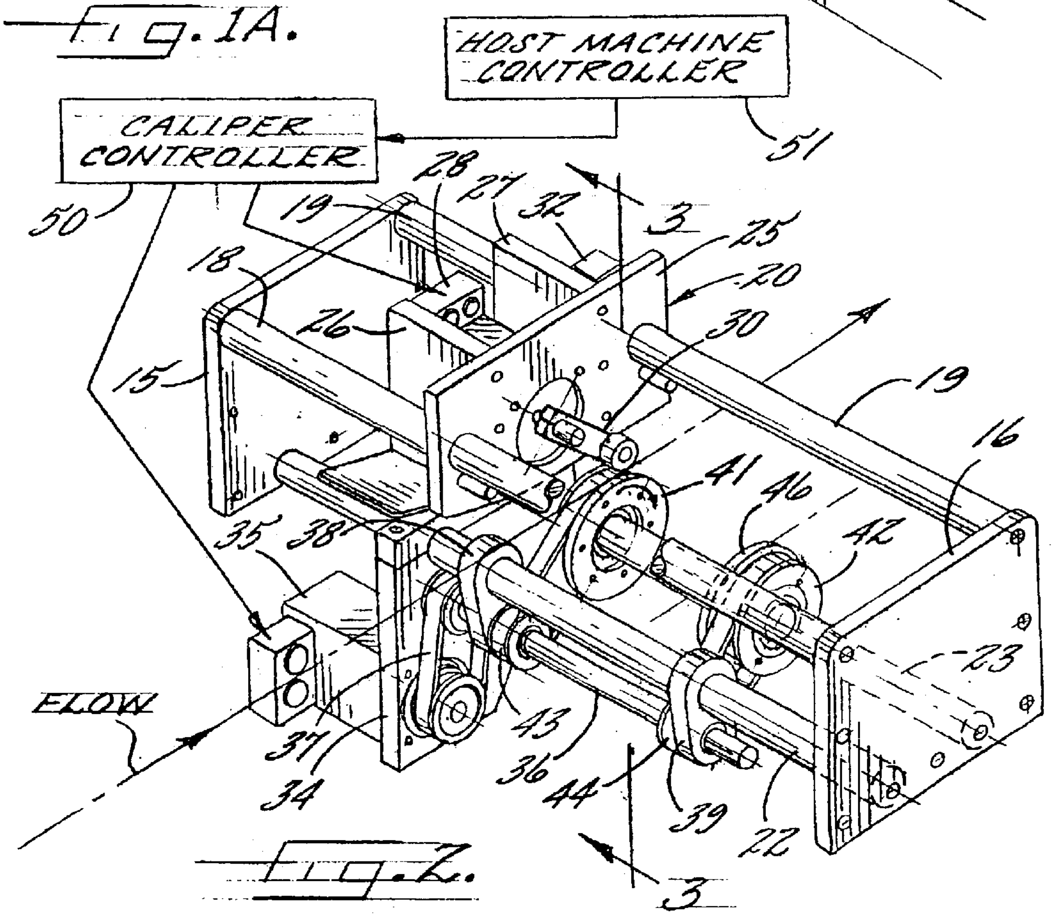
Fig. 2.

CALIPER FOR MEASURING THE THICKNESS OF COLLATED PRINTED PRODUCTS

BACKGROUND OF THE INVENTION

The present invention relates to a caliper for measuring the thickness of each of a plurality of collated printed products, such as books, magazines, signatures, and the like, so as to determine whether the printed products contain the proper number of sheets.

In collating conveyor systems, it is common to incorporate a caliper along the path of travel of the products to check the thickness of each product and thereby verify that there has not been a malfunction in the collating process resulting in either missing sheets or excessive sheets. If a malfunction is detected, the caliper issues a signal which causes the non-complying product to be rejected or otherwise identified to permit the error to be corrected.

Calipers used with such systems in the past have typically comprised a lever arm which is moved into contact with the advancing products by means of an actuator, such as an air cylinder or a linear electric transducer, and a microswitch is provided which issues a go/no-go signal depending upon whether or not the lever arm has been pivoted by the actuator into the product to an elevation which indicates the proper number of sheets. Such prior devices require several mechanical linkages, and it is difficult to obtain highly accurate readings.

It is accordingly an object of the present invention to provide an improved caliper of the described type, which is highly accurate and reliable, and which is readily programmable to facilitate its initial set up and operation.

SUMMARY OF THE INVENTION

The above and other objects and advantages of the invention are achieved by the provision of an apparatus and method which includes an endless conveyor configured for serially conveying the printed products along a path of travel, and a lever arm mounted above the conveyor at a measurement station and for pivotal movement about a pivot axis which is transverse to the path of travel of the conveyor. An electric motor is provided with its output spindle connected to the lever arm so that the lever arm pivots about the pivot axis of the lever arm upon rotation of the output spindle. An encoder is connected to the output spindle for sensing the rotational position of the output spindle and thus the pivotal position of the lever arm, and a controller is provided which is responsive to a signal from the encoder for calculating the thickness of a printed product upon the lever arm being pivoted by the electric motor into pressing engagement with the upper surface of the product. The controller also compares the calculated thickness with a predetermined correct value, and issues a reject or other signal whenever the calculated thickness varies from the predetermined correct value by more than a permissible tolerance.

In a preferred embodiment, the apparatus further comprises a lifting member positioned to engage and lift the undersurface of each product as it is conveyed past the lever arm, and so that at least a portion of each product is lifted when it is engaged by the lever arm. The lifting member preferably comprises an eccentric roller which is rotated about an axis which is traverse to the direction of the conveyed products and a second electric motor for rotating the roller about its axis at a peripheral speed which is substantially equal to the conveying speed of the products on the conveyor.

The electric motor which is connected to the lever arm preferably comprises a servo motor of the type wherein its rotational torque may be controlled by the level of the power supplied thereto. In this case, the servo motor may be operated at a relatively high power level so as to pivot the lever arm about its pivot axis to press or bias the lever arm into the product and squeeze the product between the lever arm and the underlying eccentric roller, until a predetermined resistance is reached. The encoder senses the rotational position at this point, and the thickness may be accurately calculated in the controller.

Subsequent to the sensing step, the power level to the motor may be reduced to a level where the lever arm may be easily pivoted. This facilitates the continued advance of the measured product and the receipt of a trailing product at the measurement station.

The conveyor may take the form of a mail table having a flat upper surface with a pair of transversely spaced drive chains. This embodiment is particularly suitable for processing complete books or other printed products which lie flat on the table as they are advanced by the conveyor. Also, in such embodiment, the lever arm, the electric motor, and the encoder may be mounted to a subassembly which is mounted for movement transversely across the path of travel of the products on the conveyor. Also, the lifting member may comprise a pair of transversely spaced apart eccentric rollers which are mounted below the upper surface of the table for rotation about a common axis which is transverse to the path of travel. The subassembly may be selectively moved transversely so that the lever arm may be positioned to cooperate with either one of the rollers. This configuration permits different areas of the products to be sensed by the caliper, which can be of significant benefit in instances where a card is inserted in each product and it is not desired to measure through the card. Thus the subassembly can be shifted to measure at a location where the card is not present. In other cases, it may be desired to measure through the card, and the ability to laterally shift the subassembly also permits this function.

The caliper may be initially calibrated by positioning a product with the correct number of sheets and thus with the correct thickness at the measurement station. The motor is then actuated to move the lever arm downwardly to squeeze the product until the predetermined resistance is reached. The encoder then senses the position of the lever arm, and the controller calculates and stores the correct thickness value.

The caliper of the present invention is able to continuously process differing versions of products having differing thicknesses. In this embodiment, the host machine controller can be taught the thickness of several different product versions, and the host machine controller is then able to tell the caliper controller which version is at the measurement station and how thick it should be. The caliper can then evaluate the thickness based upon the correct thickness for that version.

The conveyor may also take the form of a "saddle" conveyor wherein the products straddle the conveyor. This embodiment may utilize only a single eccentric roller to lift the products at the measurement station, and it measures half the thickness of each product, but it is otherwise similar in its calibration and operation to the above described mail table embodiment.

BRIEF DESCRIPTION OF THE DRAWINGS

The present invention now will be described more fully with reference to the accompanying drawings, in which:

FIG. 1 is a fragmentary perspective view of a conventional mail table with one embodiment of the caliper of the present invention attached thereto;

FIG. 1A is a fragmentary view of the eccentric roller and lever arm of the caliper shown in FIG. 1;

FIG. 2 is a perspective view of the caliper of FIG. 1 with parts broken away;

DETAILED DESCRIPTION OF THE PREFERRED EMBODIMENTS

Figure 3:
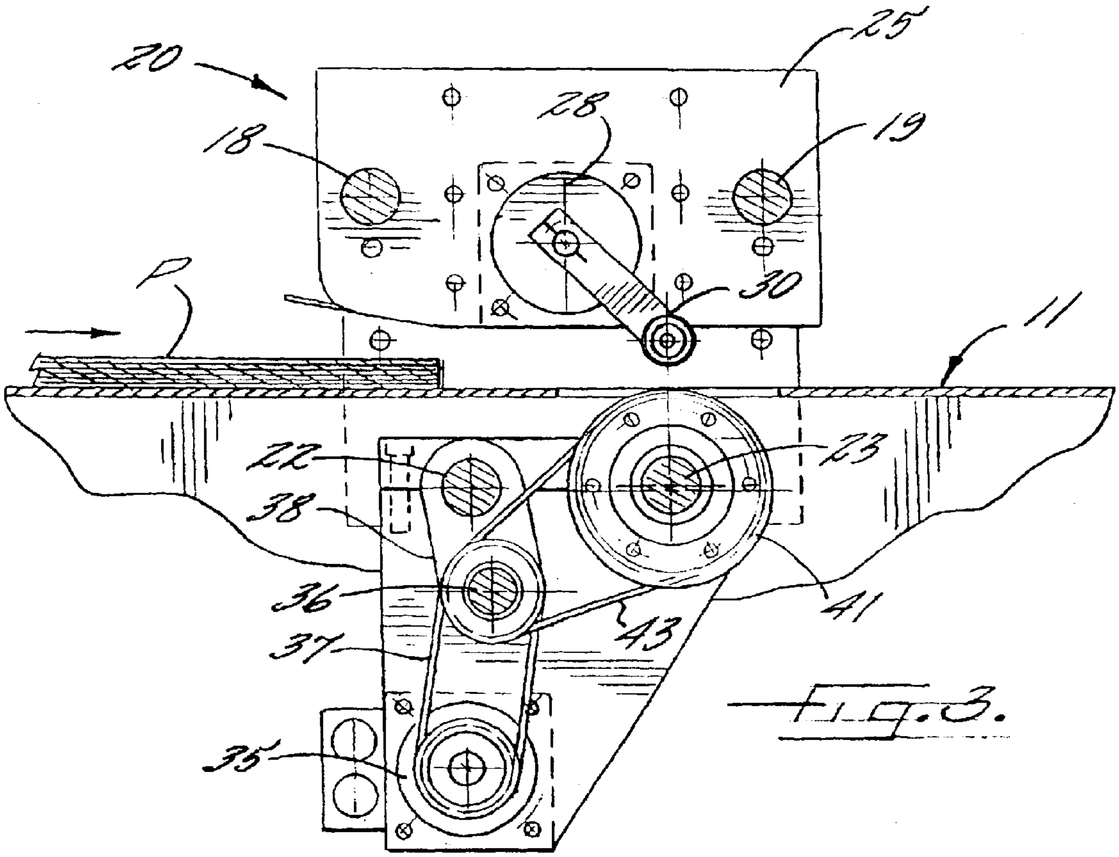
FIG. 3 is a sectional view taken along the line 3—3 of FIG. 2.

FIGS. 1–4 illustrate an embodiment of the caliper 10 of the present invention which is used in association with a mail table 11 or the like. As is conventional, the mail table 11 is positioned downstream of a collating assembly line or trimmer and it incorporates two feed chains 12, 13 which carry the collated products P serially along the table and past a measurement station which is defined by the location of the caliper 10. As further described below, the caliper 10 serves to measure the thickness of the individual products to determine whether the proper number of sheets are present in each product.

The caliper 10 includes a pair of end plates 15, 16 which are fixed to opposite sides of the table, and a pair of parallel upper guide rods 18, 19 which are fixed to the end plates so as to extend transversely across and above the table 11. The two upper guide rods 18, 19 in turn mount a subassembly 20 which is slideable along the rods in the manner further described below. A pair of lower rods 22, 23 are fixed to extend between the end plates so as to extend below the upper surface of the table.

The subassembly 20 comprises a front mounting plate 25 having a pair of side plates 26, 27 mounted to the back side thereof, and a servo motor 28 is also mounted to the back side of the plate 25 so that the output spindle of the motor extends through an opening in the plate 25. The output spindle of the servo motor mounts a radial pivot arm 30. Also, a position block 32 is secured to the side plate 27 and is releasably fixed to the guide rod 19 so as to permit the subassembly 20 to slide between a rearward position as shown in FIGS. 1–2 and a forward position as further described below when the block 32 is loosened on the guide rod 19.

Figure 4:
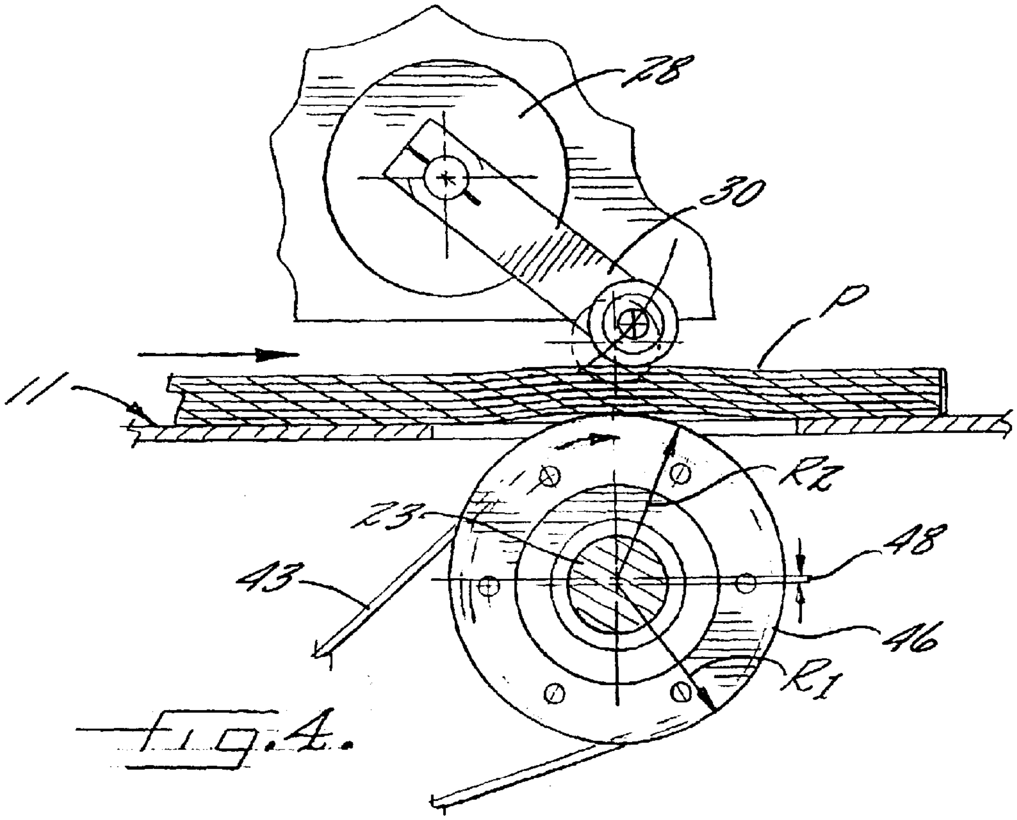
FIG. 4 is a sectional view similar to FIG. 3 and illustrating the lifting of a printed product by the eccentric roller.
Figure 5:
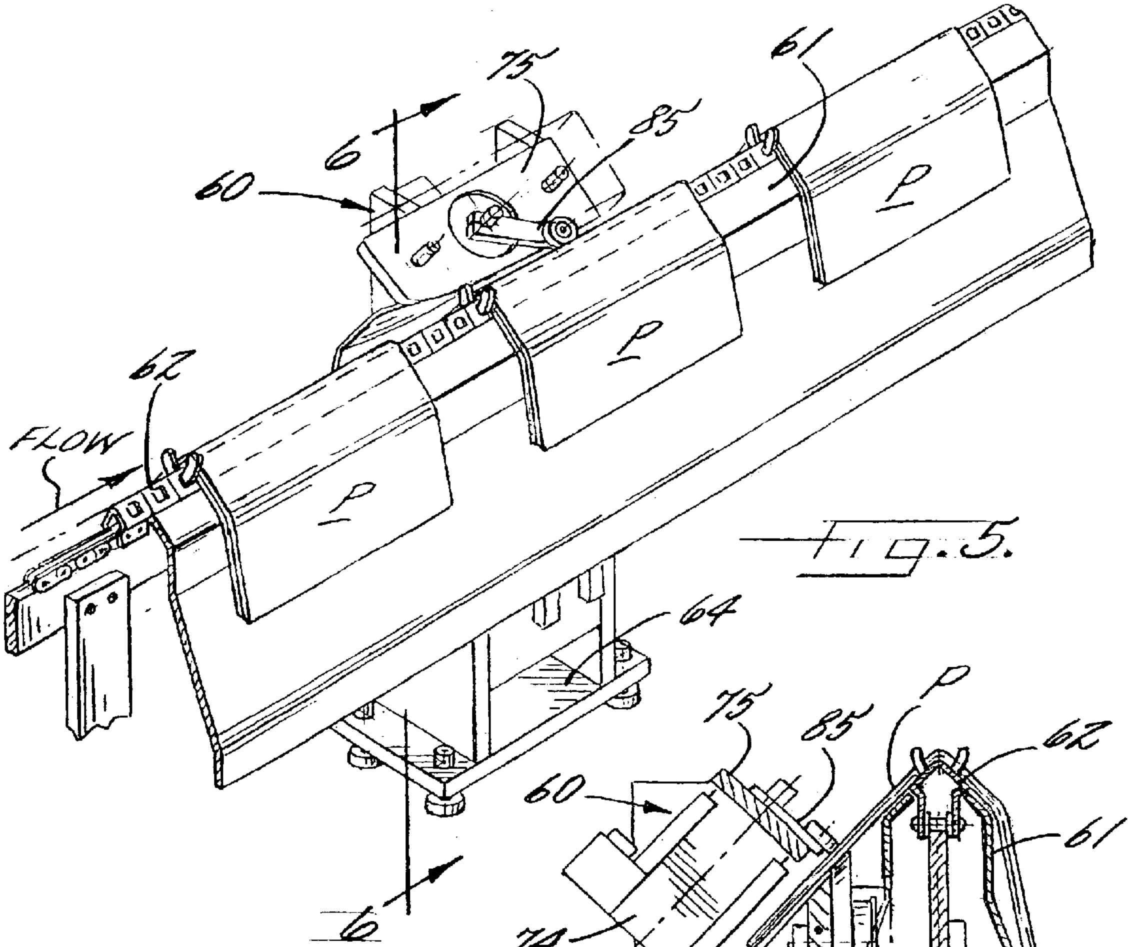
FIG. 5 is a perspective view of a saddle conveyor with a second embodiment of the caliper of the invention.

A motor mount 34 is fixed to the pair of lower rods 22, 23 so as to depend in a plane parallel to that of the front plate 25. The motor mount 34 mounts a second servo motor 35 which has an output spindle which is rotatably connected to a shaft 36 via a timing belt and pulley assembly 37. The shaft 36 extends parallel to and is rotatably supported from the lower rod 22 by a pair of swing arms 38, 39. Also, the shaft 36 is rotatably connected to a pair of pulleys 41, 42 via the timing belt and pulley assemblies 43, 44 respectively. The pulleys 41, 42 are mounted via bearings so as to be rotatable about the axis of the lower rod 23, and each of the pulleys 41, 42 mounts an eccentric roller 46 as best seen in FIG. 4.

Each of the eccentric rollers 46 is generally circular but slightly eccentric in its peripheral outline, in that it has a generally circular outline but with a raised arcuate segment of increased radius along about ¼ of its periphery. In the specific embodiment illustrated in FIG. 4, the lower ¾ of the periphery of the roller 46 is defined by a radius $R_1$, and the upper ¼ of the periphery, which defines the raised arcuate segment, is defined by a radius $R_2$. The radius $R_2$ is centered on the axis of the rod 23, while the radius $R_1$ is centered at a point slightly above the axis of the rod 23 to define an offset 48, when the roller is rotated to the position shown in FIG. 4. Thus the portion of the outer periphery defined by the radius $R_1$ is in the nature of a relief.

The radius $R_2$ is dimensioned to define a circumference which equals the distance between the products being conveyed along the table 11, and the rollers 46 are mounted so that the raised arcuate segment of each roller extends through an opening in the upper surface of the table 11 and to a point slightly above the upper surface of the table. The radius $R_1$ is dimensioned so as to lie flush with or slightly below the upper surface of the table, and the offset 48 is typically about 1/16 inch. Also, the raised arcuate segments of the two rollers are transversely aligned.

The servo motor 28 may comprise for example Model No. MPL-A310P-HK22AA, manufactured by the Allen/Bradley Company, and the servo motor 35 may comprise for example Model No. MPL-310P-SJ22AA also manufactured by the Allen/Bradley Company. Also, the motor 28 includes a high resolution encoder, which is in turn connected to a controller 50. The motor 35 also includes an encoder and is also connected to the controller 50. The controller 50 for the caliper is in turn connected to a host machine controller 51 which includes a master encoder and controls the operation of the mail table 11 and supplies signals to the caliper controller 50 as further described below.

As shown in FIGS. 1 and 2, the subassembly 20 is positioned in its rearward position, where it is held by the position block 32 which is locked to the rod 19. In this position, the pivot arm 30 is aligned with the eccentric roller 46 which is mounted to the pulley 41. Upon releasing the position block 32, the subassembly 20 may be moved forwardly to a position (not illustrated) wherein the pivot arm 30 is aligned with the eccentric roller 46 which is mounted to the pulley 42. The position block 30 may then be re-secured to hold the subassembly in the advanced position.

Calibrating the Caliper

The caliper 10 as illustrated in FIGS. 1–4 may be initially calibrated for operation by the following steps:

a. A product P with the correct number of sheets, and thus with the correct thickness, is placed on the mail table at the measurement position.

b. The eccentric rollers 46 are rotated so that the roller which is aligned with the arm 30 lifts the product toward the arm.

c. The controller 50 actuates the servo motor 28 at a relatively high power level, such as about 30 amps, to move the arm down to squeeze the product until a predetermined resistance is reached, and the controller 50 then calculates and stores the "correct" thickness, using an appropriate trigonometric function.

d. The controller 50 adjusts the power to the motor 28 to a relatively low power setting such as about 2 amps, where the motor holds the arm 30 with a force which is easily overcome.

e. The product P is advanced from the measurement station, and with the easily moveable arm 30 providing no significant resistance.

Operating Sequence

After the calibration as described above is completed, the caliper is ready for operation, as follows:

a. The mail table 11 is operated by the host machine controller 51 to serially convey the products P past the measuring station, and the servo motor 35 is operated at a speed monitored by the encoder of the motor 35 so that the peripheries of the eccentric rollers 46 have a speed which is in a one to one relationship with the advancing speed of the products along the table. Also, the raised arcuate segments of the eccentric rollers 46 are timed by a signal from the host machine controller so as to lift at least a portion of each product as it moves through the measurement station.

b. With the servo motor 28 at the low power setting as indicated above, the lifted product engages the lever arm 30 and the lever arm is slightly lifted.

C. The caliper is instructed to take the thickness reading based upon the position of the product as signaled by the host machine controller 51. Shortly before that position is reached, e.g. about one inch before, the controller 50 turns on the full power to the servo motor 28 to move the arm 30 back downwardly, so as to squeeze the lifted portion of the product to the same predetermined power level achieved during the calibration sequence.

d. While the product is being squeezed, the rotational position is noted by the encoder associated with the motor 28 and signaled to the controller 50.

e. The controller 50 calculates from the encoder signal the thickness of the particular product which is engaged, again using an appropriate trigonometric function.

f. The calculated thickness is then compared with the predetermined correct value as determined during the calibration sequence, and a reject or other signal is issued whenever the calculated thickness varies from the predetermined correct value by more than a permissible tolerance.

g. The controller 50 acts to reduce the power level to the motor 28 to the indicated low level, to minimize any resistance caused by the arm 30 to the continued movement of the product being measured and the arrival of the next product.

In some applications, a card C, flyer, or other insert is inserted in each product which occupies only a portion of the area of the product, note FIG. 1A. Also, in such cases, it is often preferred not to measure through the area which contains the insert since erroneous thickness readings become more likely. With the embodiment of the caliper shown in FIGS. 1–4, this problem can be avoided by permitting the subassembly 20 to be shifted to operate with the eccentric roller 46 which is aligned with an area of the products where the insert is not present. In other cases, it may be desired to measure through the card, and the ability to laterally shift the subassembly also permits this function.

Thus the test location of the products can be shifted between the left and right sides of the products by reason of the mobility of the subassembly, and it can also be shifted between the front and back edges of the products by the timing of the measurement sequence as signaled by the host machine controller.

In an embodiment which does not include the eccentric rollers 46, the caliper 10 is calibrated without lifting the products, and during operation, the products lift the lever arm 30 by reason of their own thickness while the arm is relaxed, i.e. under the low power setting. Thereafter, the power to the servo motor 28 is increased to lower the arm 30 and squeeze the product as described above.

However, the lifting of the products at the measurement station is preferred since it avoids the need to move the arm 30 through the thickness of each product. Thus lifting the products permits the necessary pivotal movement of the lever arm 30 to be minimized, and the speed of operation may be increased.

Figure 6:
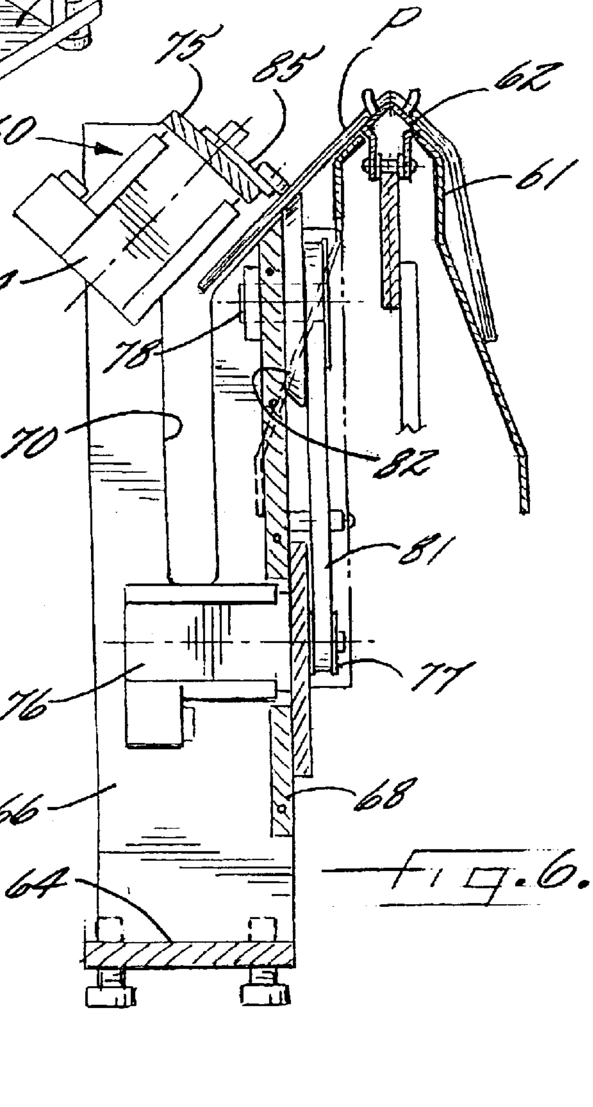
FIG. 6 is a sectional view taken along the line 6—6 of FIG. 5.

The caliper 60 of FIGS. 5–8 is designed for use with a "saddle" conveyor 61 wherein the collated products straddle a conveyor chain 62 having the form of an inverted V in transverse cross section, note FIG. 6. The caliper 60 includes a mounting base 64 mounting a pair of vertical side plates 65, 66 and a front plate 68. The upper ends of the side plates 65, 66 are vertically slotted at 70, and they mount a guide plate 72 which lifts the left half of the products as seen in FIG. 6 and supports the lifted half at about a 45° incline as it moves into the measurement station defined by the caliper 60.

A servo motor 74 and encoder are mounted to a motor mount 75, which is in turn mounted between the two side plates 65, 66 so that the axis of the output spindle of the motor 74 is inclined at an angle of about 45° as seen in FIG. 6.

Figure 7:
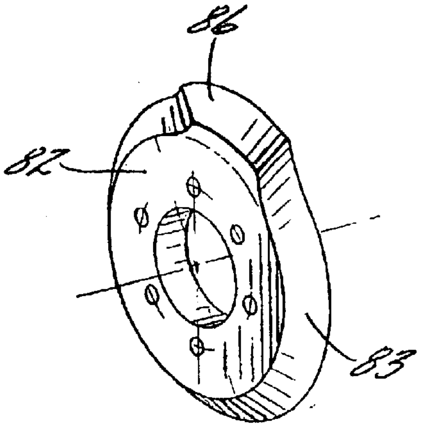
FIG. 7 is a perspective view of the eccentric roller as used in the caliper of FIG. 5.
Figure 8:
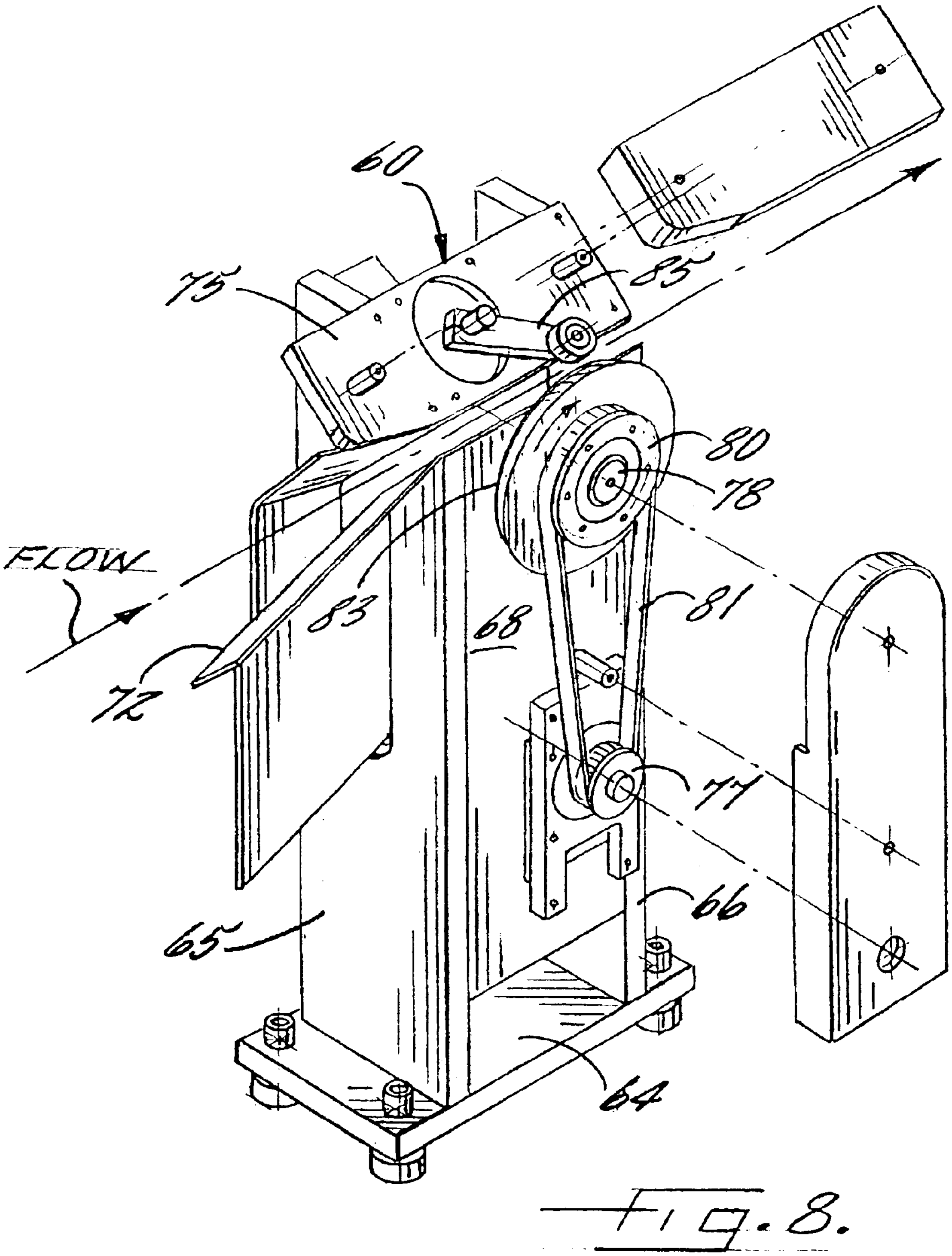
FIG. 8 is an exploded perspective view of the caliper of FIG. 5.

A second servo motor 76 is mounted to the front plate 68 so that the motor 76 is positioned between the side plates 65, 66, and the second motor 76 includes an output spindle which extends forwardly from the front plate 68 and mounts a drive pulley 77. The front plate 68 also fixedly mounts a fixed shaft 78, which in turn mounts a timing pulley 80 via a suitable bearing, such as a double row angular contact bearing. The drive pulley 77 and the pulley 80 are rotatably interconnected by a timing belt 81, and the timing pulley 80 is fixed to an eccentric roller 82, as best seen in FIG. 7. The eccentric roller 82 includes an inclined or conical outer periphery 83 which generally matches the inclination of the axis of the motor 74 where viewed in cross section, note FIG. 6.

The output spindle of the motor 74 mounts a pivot arm 85 which, by reason of the inclined orientation of the motor, is aligned to oppose the inclined periphery 83 of the eccentric roller 82.

The eccentric roller 82 used in the embodiment of FIGS. 5–8 includes a raised arcuate segment 86 which is concentric to the reminder of the periphery and serves to lift each product into the lever arm at the measurement station. For this purpose, the roller 82 is positioned so that the raised segment 86 extends above the plane defined by the guide plate 72, and the second motor 76 rotates the pulley 80 and eccentric roller 82 at a one to one timed relationship with the conveyor chain 62, so that the raised segment 86 lifts each product as it moves through the measurement station.

The calibration and operation of the caliper 60 of FIGS. 5–8 is essentially the same as that described above with respect to the caliper 10 of FIGS. 1–4. However, the caliper 60 includes only a single eccentric roller, and it is programmed to measure only one half the thickness of each product.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of measuring the thickness of each of a plurality of collated printed products to determine whether the printed products contain the proper number of sheets, comprising the steps of serially conveying the printed products along a path of travel which includes a measurement station, engaging the top surface of each printed product as it moves along the path of travel and through the measurement station by a lever arm which is mounted for pivotal movement about a pivot axis which is transverse to the path of travel and which is connected to the output spindle of an electric motor, sensing the pivotal position of the lever arm by means of an encoder which is connected to the output spindle of the electric motor, calculating from the sensed rotational position of the lever arm the thickness of the printed product which is engaged, and comparing the calculated thickness with a predetermined correct value, and issuing a reject or other signal whenever the calculated thickness varies from the predetermined correct value by more than a permissible tolerance.

2. The method of claim 1 wherein the engaging step includes operating the electric motor at a relatively high power level so as to pivot the lever arm about said pivot axis to press the arm into the product until a predetermined resistance is reached, and wherein the sensing step occurs while the lever arm is pressed into the product.

3. The method of claim 2 wherein the engaging and sensing steps occur upon each product reaching a predetermined position along the path of travel.

4. The method of claim 2 wherein, subsequent to the engaging and sensing steps, the power level to the motor is reduced to a level wherein the lever arm may be readily pivoted about the pivot axis to thereby facilitate the continued advance of the measured product and the receipt of a trailing product into the measurement station.

5. The method of claim 4 wherein, prior to the engaging step, at least a portion of each product is lifted upwardly from the path of travel so that the lifted portion is engaged by the lever arm during the engaging step.

6. The method of claim 5 wherein each product is lifted upwardly by engaging an undersurface of each product as it is conveyed through the measurement station with an eccentric roller which is rotated about an axis extending parallel to said pivot axis at a peripheral speed which is generally equal to the conveying speed of the products.

7. The method of claim 1 comprising, prior to the serially conveying step, the further initial step of calibrating the lever arm by positioning a product with the correct number of sheets and thus with the correct thickness at the measurement station, actuating the motor to move the lever arm downwardly to squeeze the product until a predetermined resistance is reached, sensing the position of the lever arm when the predetermined resistance is reached and calculating from the sensed rotational position the predetermined correct value, and storing the predetermined correct value, and reducing the power to the motor so that the motor holds the lever arm with a force which is easily overcome and so that the product can be readily removed from the measurement station.

8. A method of measuring the thickness of each of a plurality of collated printed products to determined whether the printed products contain the proper number of sheets, comprising the steps of calibrating a caliper which includes a lever arm which is connected to the output spindle of an electric motor, and with an encoder connected to the motor so as to monitor the rotational position of the lever arm, comprising the steps of (a) positioning a product with the correct number of sheets and thus with the correct thickness at a measurement station, (b) actuating the motor at a relatively high power level to move the lever arm downwardly to squeeze the product until a predetermined resistance is sensed, (c) sensing the position of the lever arm via the encoder when the predetermined resistance is reached and calculating from the sensed rotational position a predetermined correct value of the thickness and storing the predetermined correct value, (d) reducing the power to the motor so that the motor holds the lever arm with a force which is easily overcome, and (e) withdrawing the product from the measurement station, and then operating the caliper to sequentially measure the thickness of a plurality of printed products, comprising the steps of (f) serially conveying the printed products along a path of travel which includes the measurement station, (g) actuating the motor at a relatively high power level to move the lever arm downwardly to squeeze each product as it moves along the path of travel and through the measurement station until the predetermined resistance is reached, (h) sensing the position of the lever arm via the encoder when the predetermined resistance is reached, (i) calculating from the sensed rotational position of the lever arm the thickness of the printed product which is engaged, (j) comparing the calculated thickness with the stored predetermined correct value, and issuing a reject or other signal whenever the calculated thickness varies from the predetermined correct value by more than a permissible tolerance, and (k) reducing the power to the motor so that the motor holds the lever arm with a force which is easily overcome.

9. The method of claim 8 wherein, prior to each of steps (b) and (g), at least a portion of each product is lifted upwardly from the path of travel at the measurement station so that the lifted portion is engaged by the lever arm during each of steps (b) and (g).

10. The method of claim 9 wherein each product is lifted upwardly by engaging an undersurface of each product as it is conveyed through the measurement station with an eccentric roller which is rotated about an axis extending transverse to the path of travel along which the printed products are serially conveyed and with the eccentric roller having a peripheral speed which is generally equal to the conveying speed of the products.

11. A method of measuring the thickness of each of a plurality of collated printed products to determine whether the printed products contain the proper number of sheets, comprising the steps of serially conveying the printed products along a path of travel which includes a measurement station, lifting at least a portion of each printed product as it moves along the path of travel and through the measurement station, engaging the lifted portion of each printed product with a lever arm which is mounted for pivotal movement about a pivot axis which is transverse to the path of travel, sensing the pivotal position of the lever arm by means of an encoder which is operatively connected to the lever arm, calculating from the sensed rotational position of the lever arm the thickness of the printed product which is engaged, and comparing the calculated thickness with a predetermined correct value, and issuing a reject or other signal whenever the calculated thickness varies from the predetermined correct value by more than a permissible tolerance.

12. The method of claim 11 wherein the lifting step includes engaging an undersurface of each product as it is conveyed through the measurement station with an eccentric roller which is rotated about an axis extending parallel to said pivot axis at a peripheral speed which is generally equal to the conveying speed of the products.

13. The method of claim 12 comprising, prior to the serially conveying step, the further initial step of calibrating the lever arm by positioning a product with the correct number of sheets and thus with the correct thickness at the measurement station, actuating the motor to move the lever arm downwardly to squeeze the product until a predetermined resistance is reached, sensing the position of the lever arm when the predetermined resistance is reached and calculating from the sensed rotational position the predetermined correct value, and storing the predetermined correct value, and reducing the power to the motor so that the motor holds the lever arm with a force which is easily overcome and so that the product can be readily removed from the measurement station.

14. An apparatus for measuring the thickness of each of a plurality of collated printed products to determine whether the printed products contain the proper number of sheets, comprising an endless conveyor configured for serially conveying the printed products along a path of travel, a lever arm mounted above the conveyor and for pivotal movement about a pivot axis which extends transverse to the path of travel, an electric motor having an output spindle connected to said lever arm so that the lever arm pivots about said pivot axis upon rotation of said output spindle, an encoder connected to the output spindle of said electric motor for sensing the rotational position of said output spindle and the pivotal position of the lever arm, and a controller responsive to a signal from said encoder for calculating the thickness of a printed product upon the lever arm being pivoted by the electric motor into pressing engagement with the upper surface of the product, for comparing the calculated thickness with a predetermined correct value, and for issuing a reject or other signal whenever the calculated thickness varies from the predetermined correct value by more than a permissible tolerance.

15. The apparatus as defined in claim 14 wherein the electric motor is a servo motor.

16. The apparatus as defined in claim 14 wherein the apparatus further comprises a lifting member positioned to engage and lift the undersurface of each product as it is conveyed past the lever arm, and so that at least a portion of each product is lifted when it is engaged by the lever arm.

17. The apparatus of claim 16 wherein the lifting member comprises an eccentric roller which is rotated about an axis which is transverse to the path of travel of the conveyed products, and a second electric motor for rotating the roller about its axis at a peripheral speed which is substantially equal to the conveying speed of the conveyor.

18. The apparatus of claim 16 wherein the lever arm, the electric motor, and the encoder are mounted on a subassembly which is mounted for transverse movement across the path of travel of the conveyed products of the conveyor, and wherein the lifting member comprises a pair of transversely spaced apart eccentric rollers which are mounted for rotation about a common axis which is transverse to the path of travel, and a second motor for rotating the rollers about said common axis at a peripheral speed which is substantially equal to the conveying speed of the conveyor, and whereby the subassembly may be selectively moved transversely so that the lever arm may be positioned to cooperate with either one of the rollers.

19. An apparatus for measuring the thickness of each of a plurality of collated printed products to determine whether the printed products contain the proper number of sheets, comprising an endless conveyor configured for serially conveying the printed products along a path of travel, a lever arm mounted above the conveyor and for pivotal movement about a pivot axis which is transverse to the path of travel, a lifting member positioned to engage and lift the undersurface of each printed product as it is moved past the lever arm, means for biasing the lever arm into engagement with the upper surface of each lifted printed product, an encoder connected to the lever arm for sensing the rotational position of the lever arm while it is biased into engagement with each lifted product, and a controller responsive to a signal from said encoder for calculating the thickness of a printed product upon the lever arm being biased into engagement with the upper surface of the product, for comparing the calculated thickness with a predetermined correct value, and for issuing a reject or other signal whenever the calculated thickness varies from the predetermined correct value by more than a permissible tolerance.

20. The apparatus as defined in claim 19 wherein the lifting member comprises an eccentric roller which is rotated about an axis which is transverse to the path of travel of the conveyed products and an electric motor for rotating the roller about its axis at a peripheral speed which is substantially equal to the conveying speed of the products.

21. The apparatus of claim 19 wherein the lever arm, the biasing means, and the encoder are mounted on a subassembly which is mounted for transverse movement across the path of travel of the conveyor, and wherein the lifting member comprises a pair of transversely spaced apart eccentric rollers which are mounted for rotation about a common axis which is transverse to the path of travel of the conveyed products, and a motor for rotating the rollers about said common axis at a peripheral speed which is substantially equal to the conveying speed of the conveyor, and whereby the subassembly may be selectively moved transversely so that the lever arm may be positioned to cooperate with either one of the rollers.

22. The apparatus of claim 21 wherein the biasing means comprises an electric servo motor and wherein the motor for rotating the rollers comprises a second electric servo motor.

* * * * *